United States Patent [19]
Barnes et al.

[11] 3,945,154
[45] Mar. 23, 1976

[54] GRINDING APPARATUS AND INDEXING AND CONTROL MEANS THEREFOR

[75] Inventors: John O. Barnes; Carl K. Barnes, both of Suffield, Conn.

[73] Assignee: Jack Barnes Engineering, Inc., Hazardville, Conn.

[22] Filed: Sept. 5, 1974

[21] Appl. No.: 503,346

[52] U.S. Cl. ............................................... 51/137
[51] Int. Cl.² ........................................ B24B 21/00
[58] Field of Search ........................... 51/135–148; 198/213

[56] References Cited
UNITED STATES PATENTS

| | | | |
|---|---|---|---|
| 449,313 | 3/1891 | Dayton | 51/137 |
| 575,870 | 1/1897 | Beers | 51/137 |
| 2,936,551 | 5/1960 | Rich et al. | 51/140 |

*Primary Examiner*—Othell M. Simpson
*Attorney, Agent, or Firm*—Ross, Ross & Flavin

[57] ABSTRACT

Work is fed to a plurality of longitudinally-spaced belt grinders by a twin-screw feed, with synchronized, non-accumulative rotation of the screws being assured by a clutch on the main drive shaft working in conjunction with a locking arm and cam.

2 Claims, 10 Drawing Figures

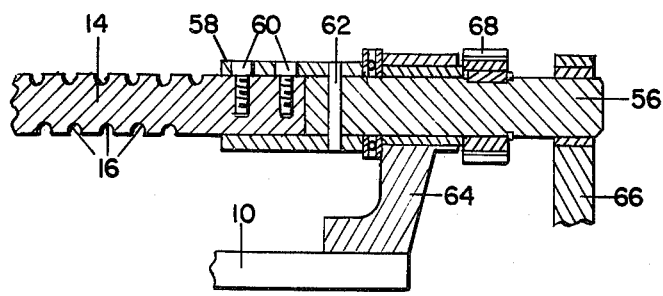
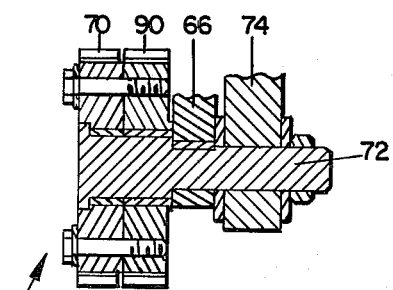
FIG. 5.   FIG. 6.
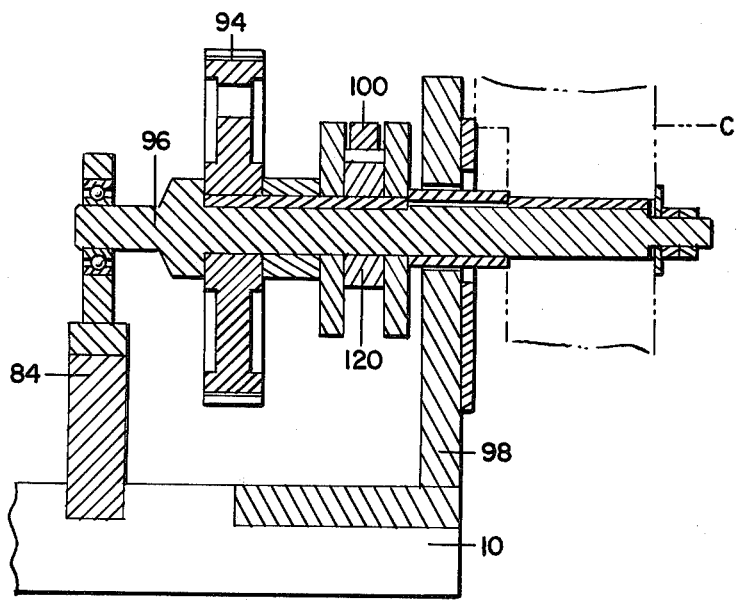
FIG. 7.
FIG. 9.
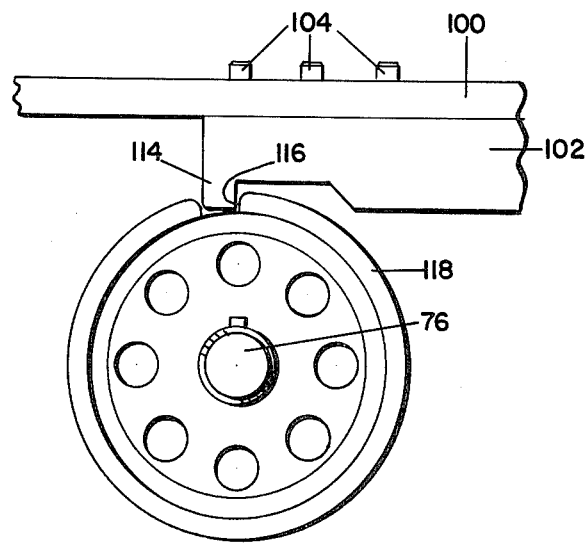
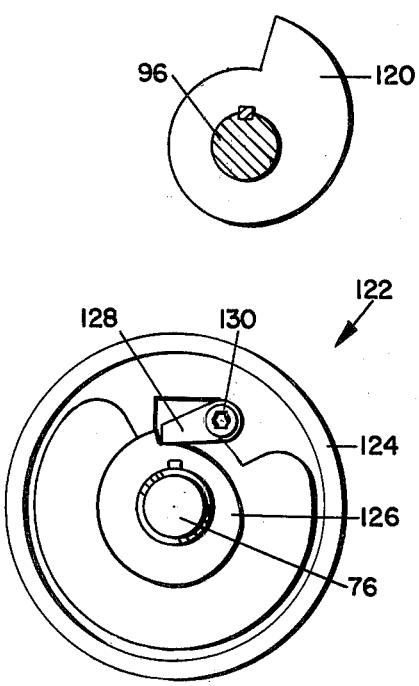
FIG. 8.   FIG. 10.

GRINDING APPARATUS AND INDEXING AND CONTROL MEANS THEREFOR

A primary object of the invention is to provide apparatus for grinding work pieces such as rod stock or the like by feeding such work pieces past a plurality of belt grinders.

Another object is to effect the feed of such work pieces by means of a pair of feed screws, the rotative movement of the screws feeding the work pieces longitudinally.

As still another feature worthy of note, we provide novel indexing and control means for the feed screws for insuring repetitive, non-accumulative concomitant rotation thereof without override.

Herein, one of the feed screws is keyed to a main drive shaft having a main drive gear thereon, the main drive gear turning a set of idler gears to turn a second gear mounted on a shaft keyed to the other feed screw, the main drive shaft additionally having a novel indexing clutch to prevent override.

These and other features will be apparent from a consideration of the annexed drawings in which:

FIGS. 4 – 7 are cross-sectional views taken on lines 4—4, 5—5, 6—6 and 7—7 respectively of FIG. 3;

FIG. 8 is a fragmentary and elevational view of the locking control means of FIG. 4, as seen from the right hand end thereof, with the supporting framework removed for clarity;

FIG. 9 is an end elevational view of the lifter cam of the indexing and drive control means of FIG. 3; and FIG. 10 is an end elevational view of the drive cam and drive dog of the indexing and drive control means of FIG. 3.

Figure 1:
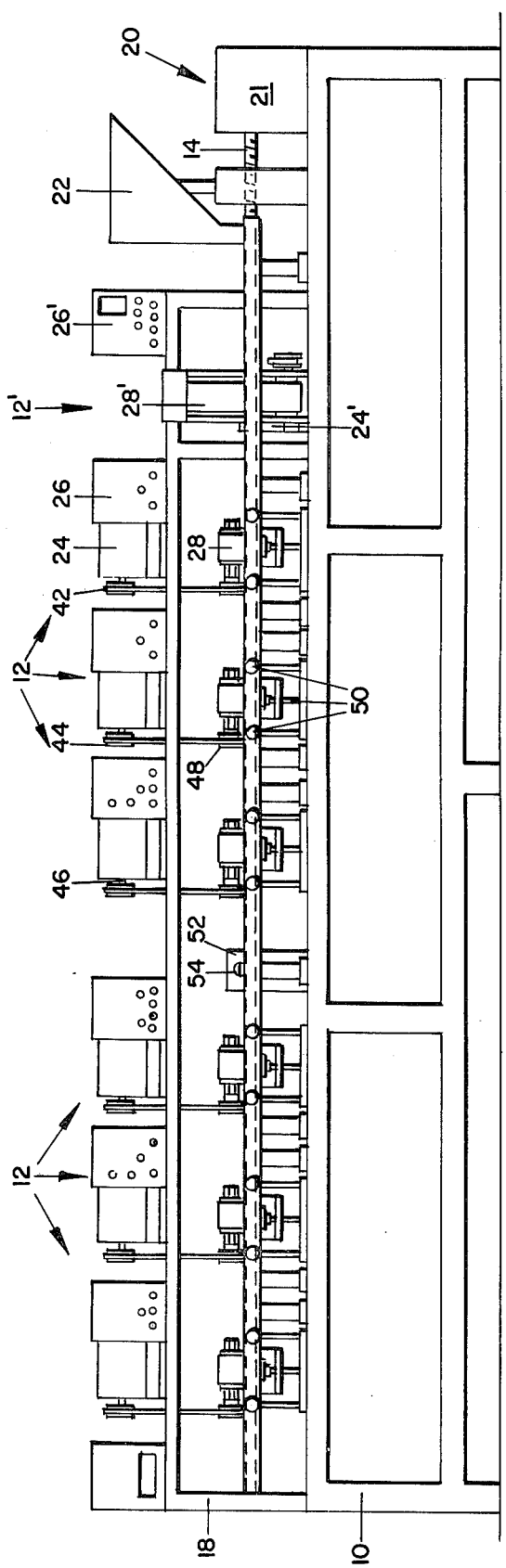
FIG. 1 is a front elevational view of apparatus embodying a preferred form of the invention.
Figure 2:
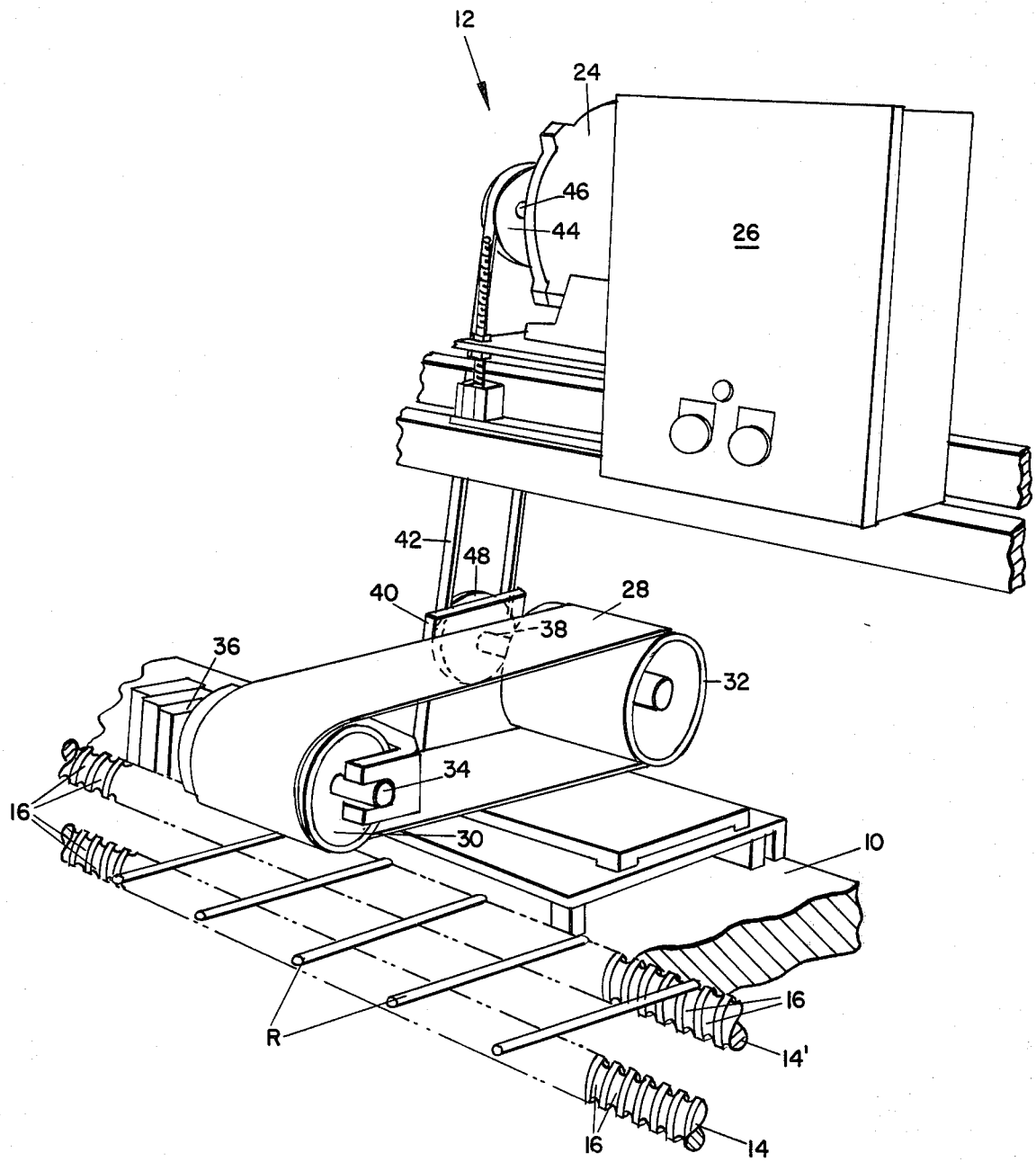
FIG. 2 is an enlarged, fragmentary perspective view of one of the grinding stations of the apparatus of FIG. 1.

With reference first to FIGS. 1 and 2, the apparatus includes a table 10 which has a plurality of grinding stations 12 spaced longitudinally therealong.

A pair of spaced, parallel, horizontally extending feed screws 14 and 14' each having helical grooves 16 therein, is disposed upwardly of table 10 so as to pass immediately below each grinding station 12, the feed screws being journalled at one end relative to an upright extension 18 of the table, with their opposite ends being linked to indexing and drive control means 20, to be described, for effecting rotation thereof, which indexing and drive control means is housed within a control box 21 fixed to the table.

A feed hopper 22 is positioned adjacent one end of the table so as to feed stock in the form of rods R onto the feed screws in manner such that the rods extend transversely between the feed screws and rest in the helical grooves 16 thereof wherefore rotation of the feed screws effects movement of the rods along the longitudinal axis of the table relative to the several grinding stations.

Each grinding station 12 includes a drive motor 24, a control panel 26 and a horizontally-disposed endless grinding belt 28.

As best seen in FIG. 2, grinding belt 28 is disposed normal to the axes of the feed screws and is entrained around a pair of spaced parallel drums 30 and 32, drum 30 being mounted on a shaft 34 journalled relative to a bracket 36 provided on table 10, and drum 32 being mounted on a shaft 38 journalled relative to a bracket 40 on table 10.

A flexible belt 42 extends between a pulley 44 fixed to the drive shaft 46 of motor 24 and a pulley 48 fixed to shaft 38 of drum 32, wherefore actuation of the motor effects rotation of the grinding belt.

Jacking and adjustment means 50 (see FIG. 1), are provided at each grinding station for adjusting the position of the drums and grinding belt relative to the feed screws and stock.

Each grinding station 12 overlies the feed screws with the grinding belts thereof being horizontally and transversely disposed relative to the axes of the feed screws for operating on the periphery of each rod R being fed therepast.

A single grinding station 12' located immediately following and adjacent feed hopper 22, has a vertically disposed grinding belt 28' which is positioned rearwardly of the feed screws for operating on the ends of the rods R. Belt 28' is actuated by a drive motor 24' and controlled by a control panel 26'.

A rod reorienting station 52 is located approximately midway of the length of the table and has a gripper 54 for gripping the end of a rod and flipping the rod over when it is desired to grind two sides of the rod in forming such as chisels, etc. In the apparatus shown herein, three of the grinding stations grind one side of the rod, the gripper flips the rod over, and the next three grinding stations grind the other side thereof.

Reference will now be made to the indexing and drive control means 20, which is shown in FIGS. 3 – 10 and which controls the speed and concomitant rotation of the feed screws 14 and 14'.

Herein, the feed screws are linked by sets of gears which include a clutch and pawl to prevent gear override, the system being non-accumulative whereby each feed screw makes only one complete revolution on one revolution of the gears.

Figure 3:
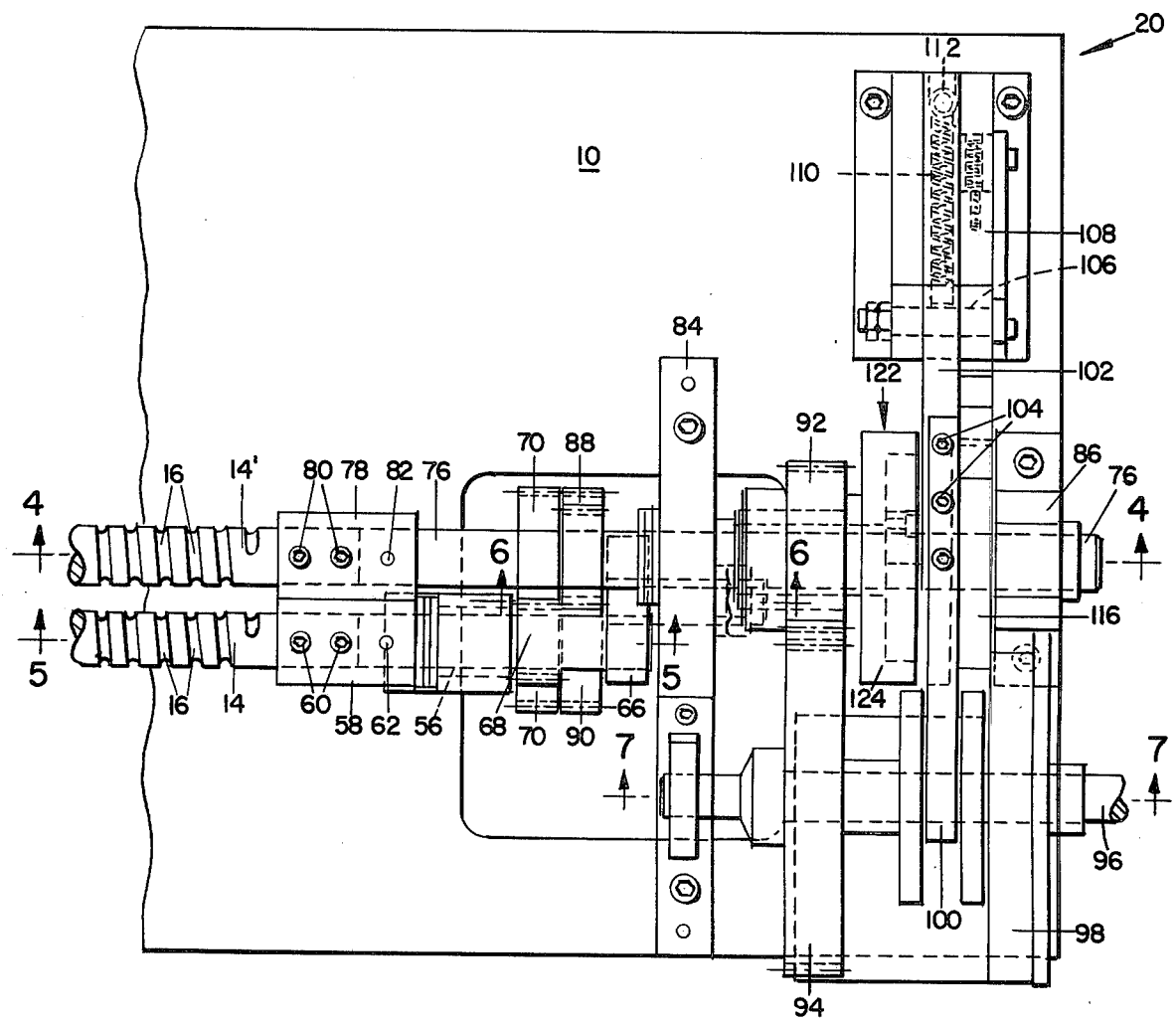
FIG. 3 is an enlarged, fragmentary top plan view of the indexing and drive control means of the apparatus.

As best seen in FIGS. 3 and 5, feed screw 14 is linked to a first stub shaft 56 by a collar 58 sleeved on one end of the feed screw and on the adjacent end of the shaft, the collar being fixed to the feed screw as by bolts 60 and being pinned to the shaft by a pin 62.

Stub shaft 56 is journalled in a support bracket 64 and in a pivot bracket 66 on table 10 and has a first feed gear 68 fixed thereto which gear meshes with a first half-part 70 of a split gear 71 fixed to an idler shaft 72 disposed below shaft 56 and journalled in pivot bracket 66 and in an additional bracket 74 on table 10, (see FIG. 6).

Figure 4:
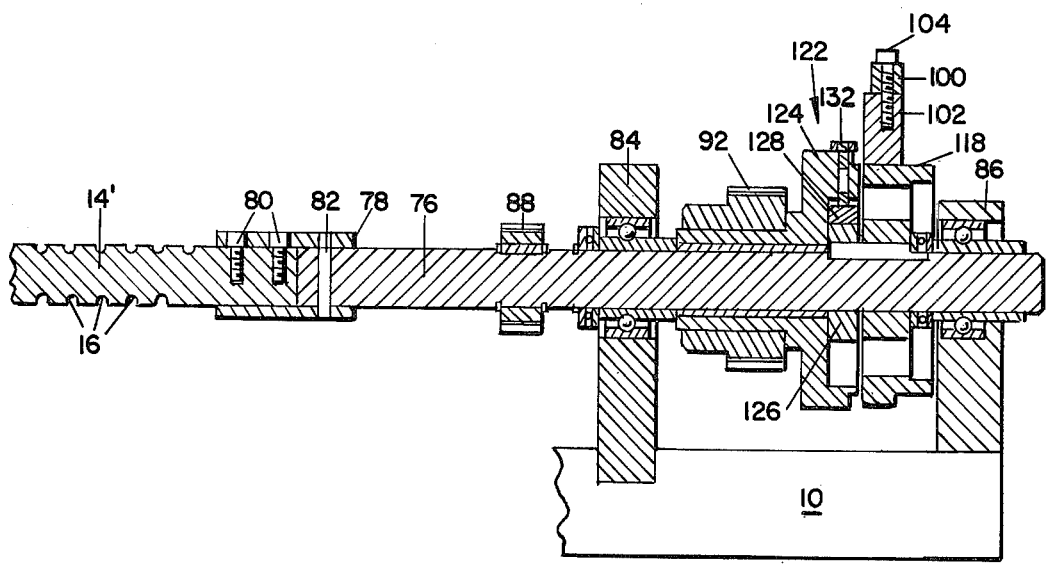

As best seen in FIGS. 3 and 4, feed screw 14' is linked to a main drive shaft 76 by a collar 78 sleeved on one end of the feed screw and on the adjacent end of the shaft, the collar being fixed to the feed screw as by bolts 80 and being pinned to the shaft by a pin 82.

Drive shaft 76 is journalled in support brackets 84 and 86 on table 10 and has a second feed gear 88 fixed thereto which gear meshes with a second half-part 90 of split-gear 71.

A third drive gear 92 fixed to drive shaft 76 meshes with a fourth drive gear 94 fixed to a second stub shaft 96 journalled at one end in support bracket 84 and at its opposite end in a support bracket 98.

Second stub shaft 96 extends outwardly from support bracket 98 to, and is driven by, a 180° rotary air cylinder C shown in phantom in FIG. 7 of the type disclosed in U.S. Pat. No. 3,494,205. While this drive means is preferred, any other suitable drive means may be employed.

By employing a two to one ratio between the gears 92 and 94, 180° rotation of the air cylinder produces one complete revolution of drive shaft 76.

Stub shaft 56 is driven in unison with drive shaft 76 by the gears 68 and 88 meshing with the half-parts of split gear 71, wherefore the feed screws 14 and 14' are also driven in unison.

Shaft 56 may be adjusted laterally by movement of pivot bracket 66 whereby stock of different lengths may be handled by the feed screws.

A combination lifter arm 100 and locking arm 102 is disposed above and extends transversely relative to the shafts 76 and 96, with the lifter arm being fixed to the upper surface of the locking arm as by bolts 104 and the locking arm being pivoted at one end as by a pivot pin 106 to a bracket 108 on table 10, the locking arm additionally being springloaded as by springs 110 and 112.

As best seen in FIG. 8, locking arm 102 has a locking finger 114 depending therefrom, which locking finger is receivable in a dwell 116 provided in a locking cam 118 fixed to drive shaft 76, all for purposes to appear.

The free end of lifter arm 100 rides on a lifter cam 120 fixed to second stub shaft 96, wherefore rotation of shaft 96 causes the end of the lifter arm to rise or fall to raise or lower the locking finger 114 of locking arm 102 out of or into dwell 116 of locking cam 118.

A clutch assembly 122, best seen in FIGS. 4 and 10, is disposed on drive shaft 76 and comprises a housing 124 enclosing an indexing cam 126 keyed to shaft 76 and a drive dog or ratchet 128 fixed within housing 124 as by a bolt 130 and rideable relative to cam 126, the drive dog or ratchet being held against the cam as by a spring-loaded plunger 132.

When air cylinder C is in a retract position, lifter cam 120 lifts locking finger 114 out of the dwell 116 in locking cam 118. As the cylinder moves to an advance position, the lifter arm 100 drops on the lifter cam 120 allowing the locking finger to lock into the dwell when the fully advanced position of the cylinder is reached, thereby repeatedly producing one complete revolution of shaft 76 and, concomitantly, feed screws 14 and 14'.

As the air cylinder returns to the retract position, the clutch housing 124 rotates the drive dog 128 around for another index against indexing cam 126.

The indexing is positive, repetitive and non-accumulative.

By spring-loading the locking arm, the clutch is precluded from over-riding as it picks up momentum.

As the locking cam 118 is released, the clutch assembly 122 is permitted to rotate one complete revolution before the cam 120 permits the locking finger 114 to drop into dwell 116 to stop rotation of main drive shaft 76.

When the main drive shaft 76 is driven in a counterclockwise direction it turns the clutch housing and indexing cam one complete revolution.

When the main drive shaft is rotated in a clockwise direction, the locking cam is held stationary by the locking arm and the clutch housing rotates wherefore the ratchet 128 falls into the indexing cam 126 for another feed rotation.

We claim:

1. Grinding apparatus comprising: a plurality of spaced belt grinders, a twin screw feed for conveying work resting in the helical grooves thereof past the grinders, and indexing and control means for effecting synchronized, non-accumulative rotation of the twin-screw feed including a system of gearing operatively connecting the screws, a rotatable clutch and indexing cam on one screw and means for precluding rotation of the clutch consisting of a locking cam on the said one screw and a locking arm selectively engageable with the locking cam.

2. Grinding apparatus according to claim 1, including a 180° rotary air cylinder for driving the twin screw feed.

* * * * *